United States Patent
Liang et al.

(10) Patent No.: US 11,114,062 B2
(45) Date of Patent: Sep. 7, 2021

(54) PROJECTION BRIGHTNESS ADJUSTMENT METHOD FOR CONTROLLING CURRENT OUTPUT OF POWER SOURCE AND PROJECTOR THEREOF

(71) Applicant: QISDA CORPORATION, Taoyuan (TW)

(72) Inventors: Li-Wei Liang, Taoyuan (TW); Chih-Wei Cho, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/898,381

(22) Filed: Jun. 10, 2020

(65) Prior Publication Data

US 2020/0410958 A1 Dec. 31, 2020

(30) Foreign Application Priority Data

Jun. 28, 2019 (CN) .......................... 201910575596.0

(51) Int. Cl.
*G09G 5/10* (2006.01)

(52) U.S. Cl.
CPC .......... *G09G 5/10* (2013.01); *G09G 2320/041* (2013.01); *G09G 2330/021* (2013.01); *G09G 2360/16* (2013.01)

(58) Field of Classification Search
CPC ............... G09G 5/10; G09G 2320/041; G09G 2330/021; G09G 2360/16; G09G 3/001; G03B 21/2053; G03B 21/16
See application file for complete search history.

(56) References Cited

U.S. PATENT DOCUMENTS

2014/0092367 A1* 4/2014 Nara .................. G03B 21/2053
353/52

* cited by examiner

*Primary Examiner* — Chad M Dicke

(57) ABSTRACT

A projection brightness adjustment method includes a power source driving a projector to project an image, a temperature sensor detecting a working temperature of the projector, the projector calculating a pixel average amount corresponding to each pixel brightness level of the image by dividing a total pixel amount of the image by a total brightness level amount of the image, and the projector controlling the power source to output an overload current to the projector for image projection when determining the working temperature is less than an upper operating-temperature limit and determining a level amount of at least one pixel brightness level having a pixel amount larger than the pixel average amount is less than or equal to half of the total brightness level amount. The magnitude of the overload current is between a maximum current limit and the upper operating-current limit.

8 Claims, 4 Drawing Sheets

PROJECTION BRIGHTNESS ADJUSTMENT METHOD FOR CONTROLLING CURRENT OUTPUT OF POWER SOURCE AND PROJECTOR THEREOF

BACKGROUND OF THE INVENTION

1. Field of the Invention

The present invention relates to a projection brightness adjustment method and a projector thereof, and more specifically, to a projection brightness adjustment method of utilizing a temperature sensor to detect a working temperature of a projector and determining whether to control a projector to enter an overload working mode according to a temperature detecting result and whether a level amount of at least one pixel brightness level having a pixel amount larger than a pixel average amount is less than or equal to half of a total brightness level amount of a projected image and a projector thereof.

2. Description of the Prior Art

In general, a conventional image projection method of reducing dark images involves providing a dynamic black function to control an output intensity of a light source according to image brightness variation. That is, the output intensity of the light source is adjusted to a lower value if an image projected by a projector is darker, and the output intensity of the light source is adjusted to a higher value if the image is brighter, so as to efficiently improve the image contrast of the projector.

In practical application, the prior art usually adopts the design of increasing the light emitting efficiency of the light source (e.g. utilizing a high-power light source, improving the light path system of the projector, or increasing the lens reflectivity and transparency of the projector) for further improving the image brightness of the projector. However, the aforesaid design of modifying the hardware design of the projector causes a high manufacturing cost. Furthermore, in the design of utilizing a high-power light source, it is necessary to additionally dispose a heat dissipating system in the projector since the working temperature of the projector is increased accordingly. Thus, the overall volume of the projector is further increased, so as to be disadvantageous to the thinning design of the projector.

SUMMARY OF THE INVENTION

The present invention provides a projection brightness adjustment method applied to a projector. The projection brightness adjustment method includes a power source driving the projector to project an image, a temperature sensor detecting a working temperature of the projector, the projector calculating a pixel average amount corresponding to each pixel brightness level of the image by dividing a total pixel amount of the image by a total brightness level amount of the image, and the projector controlling the power source to output an overload current to the projector for image projection when determining the working temperature is less than an upper operating-temperature limit of the power source and determining a level amount of at least one pixel brightness level having a pixel amount larger than the pixel average amount is less than or equal to half of the total brightness level amount. The magnitude of the overload current is between a maximum current limit and the upper operating-current limit of the power source.

The present invention further provides a projector including a projection device, a power source, and a temperature sensor. The power source is electrically connected to the projection device for driving the projection device to project an image. The temperature sensor is electrically connected to the projection device for detecting a working temperature of the projection device. The calculating unit is electrically connected to the projection device, the temperature sensor and the power source. The calculating unit calculates a pixel average amount corresponding to each pixel brightness level of the image according to a total pixel amount of the image and a total pixel brightness level amount of the image and controls the power source to output an overload current to the projection device for image projection when determining the working temperature is less than an upper operating-temperature limit of the projection device and determining a level amount of at least one pixel brightness level having a pixel amount larger than the pixel average amount is less than or equal to half of the total brightness level amount. The magnitude of the overload current is between a maximum current limit and the upper operating-current limit of the projection device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
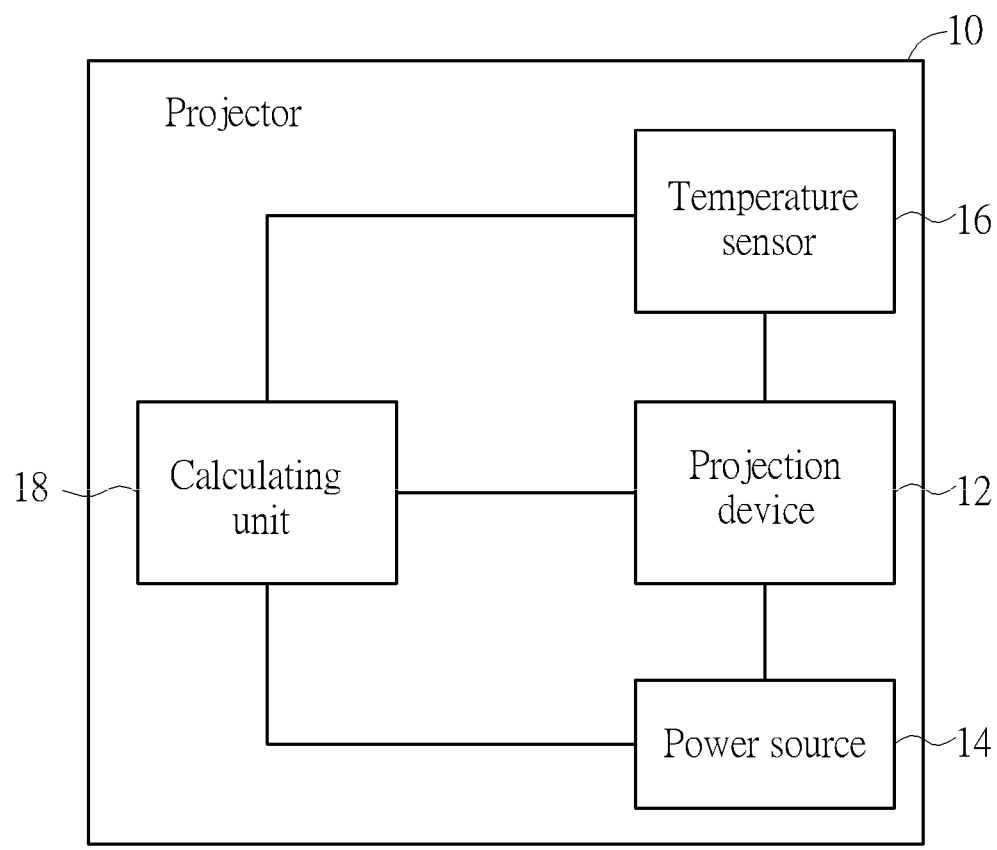
FIG. 1 is a functional block diagram of a projector according to an embodiment of the present invention.

Please refer to FIG. 1, which is a functional block diagram of a projector 10 according to an embodiment of the present invention. As shown in FIG. 1, the projector 10 could be a projector having a solid-state light source (e.g. a laser projector) and includes a projection device 12, a power source 14, a temperature sensor 16, and a calculating unit 18. The power source 14 is electrically connected to the projection device 12 for providing electrical power to drive the projection device 12 to project images. The temperature sensor 16 is electrically connected to the projection device 12 and could be preferably disposed on a major heat-generating component (e.g. a light source or a projector lens) to detect a working temperature of the projection device 12 for determining whether to increase an output current of the power source 14. The calculating unit 18 (e.g. a central processing unit, a microprocessor, or a programmable logic controller) is electrically connected to the projection device 12, the power source 14, and the temperature sensor 16. The calculating unit 18 calculates a pixel average amount corresponding to each pixel brightness level of an image projected by the projection device 12 according to a total pixel amount of the image and a total brightness level amount of the image. The calculating unit 18 also controls the power source 14 to output an overload current to the projection device 12 for image projection when determining a working temperature detected by the temperature sensor 16 is less than an upper operating-temperature limit of the projection device 12 and determining a level amount of at least one pixel brightness level having a pixel amount larger than the pixel average amount is less than or equal to half of the total brightness level amount, so as to improve the contrast of the image.

Figure 2:
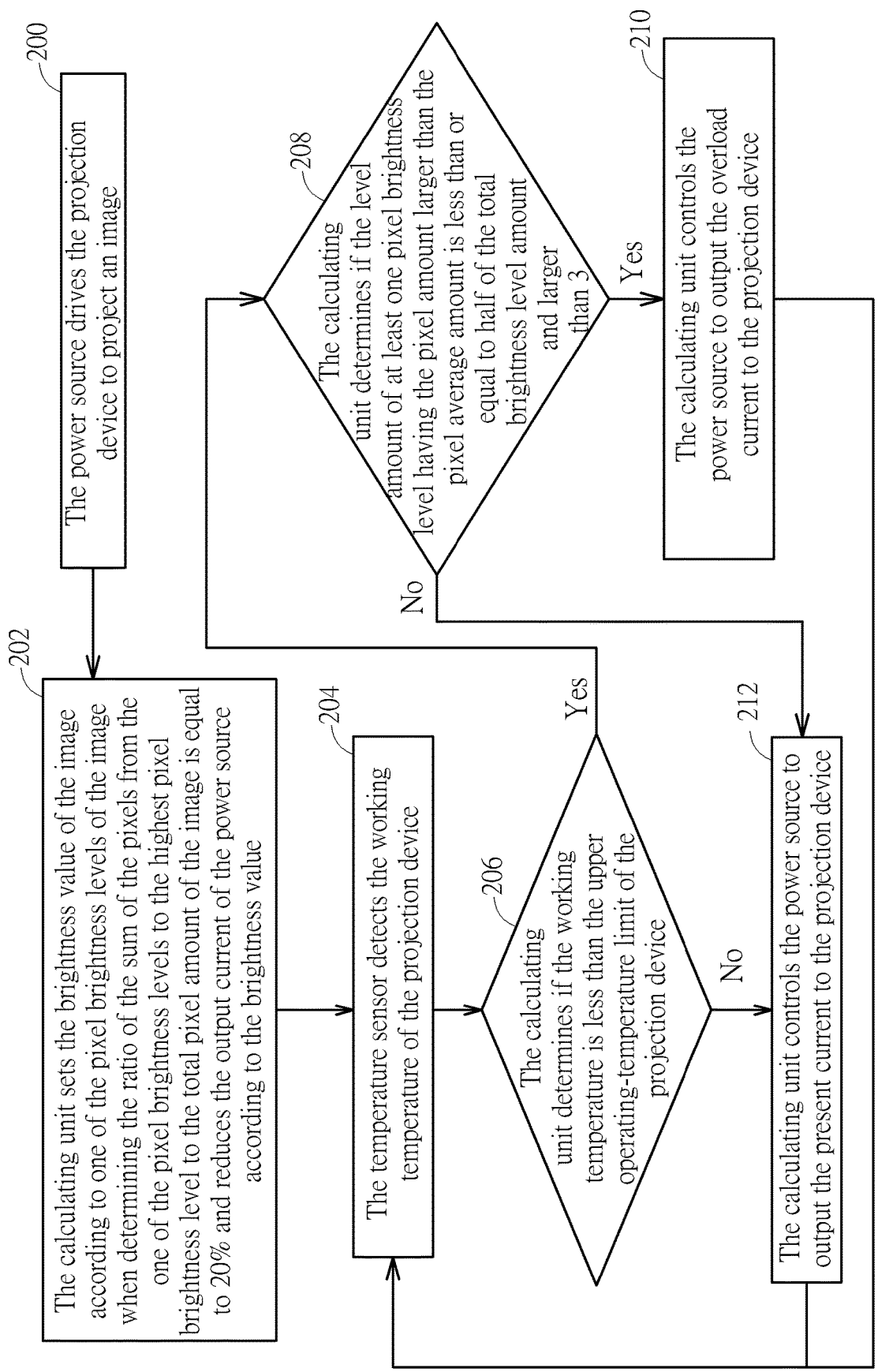
FIG. 2 is a flowchart of a projection brightness adjustment method according to an embodiment of the present invention.

Please refer to FIG. 1 and FIG. 2. FIG. 2 is a flowchart of a projection brightness adjustment method according to an embodiment of the present invention. The projection brightness adjustment method of the present invention includes the following steps.

Step 200: The power source 14 drives the projection device 12 to project an image.

Step 202: The calculating unit 18 sets a brightness value of the image according to one of pixel brightness levels of the image when determining a ratio of a sum of pixels from the one of the pixel brightness levels to the highest pixel brightness level to a total pixel amount of the image is equal to 20% and reduces an output current of the power source 14 according to the brightness value.

Step 204: The temperature sensor 16 detects a working temperature of the projection device 12.

Step 206: The calculating unit 18 determines if the working temperature is less than the upper operating-temperature limit of the projection device 12; if yes, go to Step 208; if not, go to Step 212.

Step 208: The calculating unit 18 determines if the level amount of the at least one pixel brightness level having the pixel amount larger than the pixel average amount is less than or equal to half of the total brightness level amount and larger than 3; if yes, go to Step 210; if not, go to Step 212.

Step 210: The calculating unit 18 controls the power source 14 to output an overload current to the projection device 12.

Step 212: The calculating unit 18 controls the power source 14 to output a present current to the projection device 12.

Figure 3:
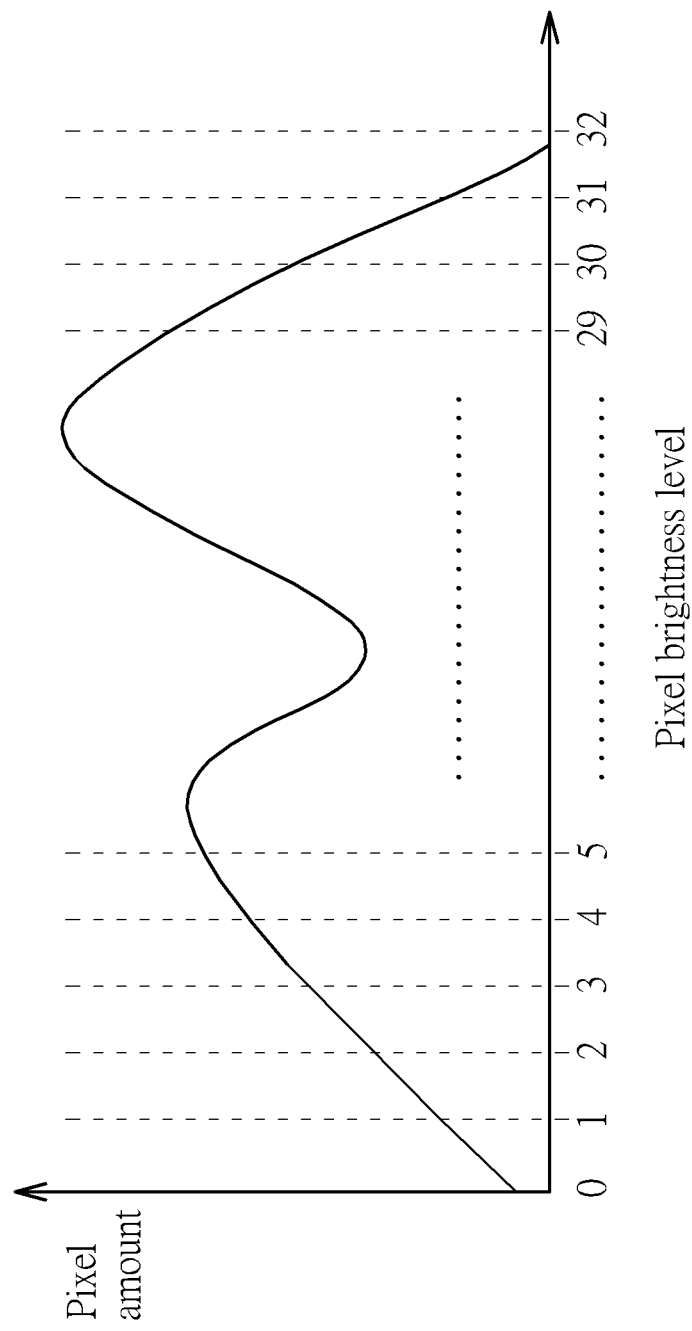
FIG. 3 is a curved line chart of a pixel brightness level and a pixel amount of an image projected by a projection device in FIG.

More detailed description for the aforesaid steps is provided as follows in the condition that the pixel brightness range (0~255) of the image is divided into 32 levels as shown in Table 1 (but not limited thereto, meaning that the present invention could adopt the design that the pixel brightness range of the image is divided into 16, 64, 128 or 256 levels in another embodiment and the related description could be reasoned by analogy according to the following description and omitted herein). In Step 200, the power source 14 outputs an unadjusted current to drive the projection device 12 to project the image, and the relationship between the pixel brightness level and the pixel amount of the image is as shown in FIG. 3.

TABLE 1

| Brightness level | Brightness range |
|---|---|
| 1 | 0~7 |
| 2 | 8~15 |
| 3 | 16~23 |
| ... | ... |
| 31 | 240~247 |
| 32 | 248~255 |

In this embodiment, for keeping the projection device 12 in a lower temperature easily when the projection device 12 is working, the projector 10 can perform Step 202. That is, the calculating unit 18 can set the brightness value of the image according to the one of the pixel brightness levels of the image when determining the ratio of the sum of the pixels from the one of the pixel brightness levels to the highest pixel brightness level to the total pixel amount of the image is equal to a specific value (preferably 20%, but not limited thereto, meaning that the specific value could be a device default value or predefined by a user). For example, it is assumed that the ratio of the sum of the pixels from the $29^{th}$ pixel brightness level to the highest pixel brightness level (i.e. the $32^{nd}$ pixel brightness level) as shown in FIG. 3 to the total pixel amount of the image (i.e. the total pixel amount from the first pixel brightness level to the $32^{nd}$ pixel brightness level) is equal to 20%, the calculating unit 18 reduces the brightness value of the image according to the $29^{th}$ pixel brightness level, and then reduces the present current of the power source 14 according to the reduced brightness value (e.g. obtaining a current corresponding to the reduced brightness value by looking up a predetermined table), so as to decrease the output power of the projection device 12 for lowering the working temperature of the projection device 12.

After the aforesaid steps are completed, the temperature sensor 16 detects the working temperature of the projection device 12 (Step 204) and outputs the working temperature to the calculating unit 18. In such a manner, the calculating unit 18 can determine whether the working temperature of the projection device 12 is less than the upper operating-temperature limit to generate the temperature monitoring effect. That is, if the calculating unit 18 determines that the working temperature of the projection device 12 is higher than the upper operating-temperature limit of the projection device 12, it means that the projection device 12 is in an overheated state and is inappropriate to perform the step of increasing the present current of the power source 14. As such, the calculating unit 18 outputs an unadjusted current to the projection device 12 (Step 212) for projecting the image at its original brightness.

Figure 4:
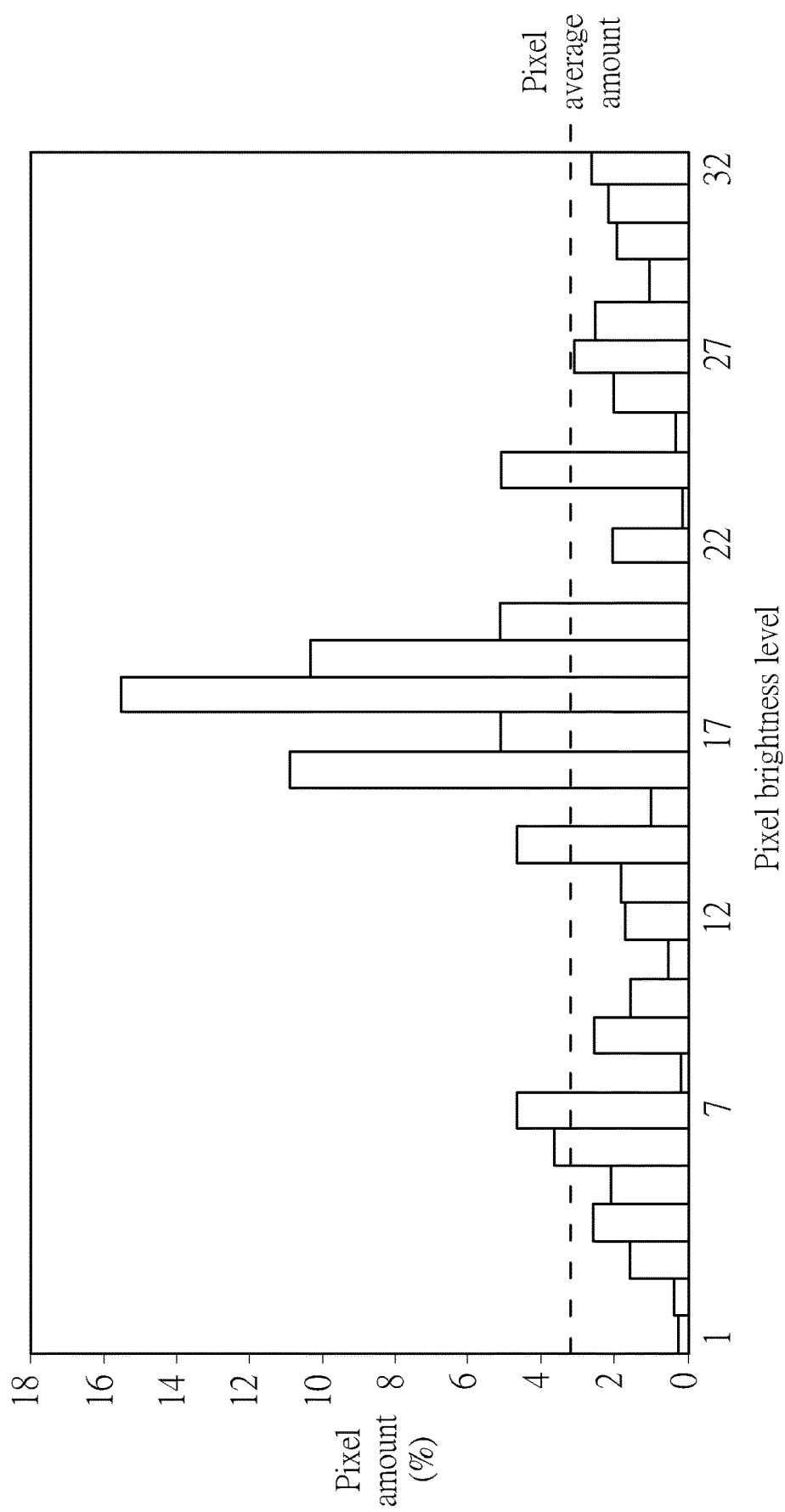
FIG. 4 is a bar chart of the pixel brightness level and the pixel amount of the image projected by the projection device in FIG. 1.

On the contrary, if the calculating unit 18 determines that the working temperature of the projection device 12 is less than the upper operating-temperature limit of the projection device 12, it means that the projection device 12 is in a low temperature state and is appropriate to perform the step of increasing the present current of the power source 14. Thus, the calculating unit 18 can further determine whether the brightness distribution of the image is concentrated enough or not (Step 208) for the subsequent brightness adjustment. For example, please refer to FIG. 4, which is a bar chart of the pixel brightness level and the pixel amount (preferably presented by percentage (%), but not limited thereto) of the image projected by the projection device 12 in FIG. 1. As shown in FIG. 4, since the $6^{th}$, $7^{th}$ $14^{th}$, $16^{th}$~$20^{th}$, and $24^{th}$ pixel brightness levels have the pixel amount larger than the pixel average amount (calculated by dividing the total pixel amount of the image by the total pixel level amount of the image (100%/32=3.125%) as shown in FIG. 4), the calculating unit 18 determines that the level amount of the $6^{th}$, $7^{th}$ $14^{th}$, $16^{th}$~$20^{th}$, and $24^{th}$ pixel brightness levels having the pixel amount larger than the pixel average amount is less than half of the total brightness level amount (i.e. 9<32/2), it means the brightness distribution of the image is concentrated enough, such as a night image or a sky image. Accordingly, the calculating unit 18 controls the power source 14 to output the overload current (the magnitude of the overload current is between a maximum current limit and the upper operating-current limit of the projection device 12) to the projection device 12 (Step 210), so as to make the projection device 12 enter an overload mode for performing image projection in a brightness enhancement manner to increase the contrast of the image.

Further, the calculating unit 18 can determine whether the level amount of the pixel brightness levels having the pixel amount larger than the pixel average amount is continuous and concentrated. For example, as shown in FIG. 4, when the calculating unit 18 determines that the level amount of the $6^{th}$, $7^{th}$, $14^{th}$, $16^{th}$~$20^{th}$, and $24^{th}$ pixel brightness levels having the pixel amount larger than the pixel average amount is larger than 3 (i.e. 9>3) and determines that a continuous level amount corresponding to the $6^{th}$, $7^{th}$, $14^{th}$, $16^{th}$~$20^{th}$, and $24^{th}$ pixel brightness levels is larger than half of the level amount of the $6^{th}$, $7^{th}$, $14^{th}$, $16^{th}$-$20^{th}$, and $24^{th}$ pixel brightness levels (i.e. 5>9/2), it means that the brightness distribution of the image is continuous and concentrated enough. Accordingly, the calculating unit 18 can control the power source 14 to output the overload current to the projection device 12 such that the projection device 12 can enter the overload mode. In practical application, if the calculating unit 18 determines that the level amount of the pixel brightness levels having the pixel amount larger than the pixel average amount is less than 3, it means that the brightness distribution of the image is extremely concentrated. At this time, the calculating unit 18 can directly control the power source to output the overload current to the projection device 12 without determining whether the continuous level amount corresponding to the pixel brightness levels having the pixel amount larger than the pixel average amount is larger than half of the level amount of the pixel brightness levels having the pixel amount larger than the pixel average amount.

To be noted, after Step 210 is completed, the calculating unit 18 can continue monitoring whether the working temperature of the projection device 12 is less than the upper operating-temperature limit of the projection device 12 (i.e. Step 204 and Step 206), to ensure that the calculating unit 18 can immediately control the projection device 12 to leave the overload mode (Step 212) when the projection device 12 is overheated, so as to surely prevent damage of components of the projector 10 due to the excessive working temperature.

On the other hand, if the calculating unit 18 determines that the level amount of the pixel brightness levels having the pixel amount larger than the pixel average amount is larger than half of the total brightness level amount, it means the brightness distribution of the image is not concentrated enough and there is no need to increase the output current of the power source 14. As such, the calculating unit 18 controls the power source 14 to output the unadjusted current to the projection device 12 (Step 212) for projecting the image at its original brightness. Similarly, after Step 212 is completed, the calculating unit 18 can continue monitoring whether the working temperature of the projection device 12 is less than the upper operating-temperature limit of the projection device 12 (i.e. Step 204 and Step 206), to ensure that the calculating unit 18 can control the projection device 12 to enter the overload mode (Step 210) when the projection device 12 is in a low temperature state and the brightness distribution of the image is concentrated enough, so as to immediately increase the contrast of the image.

It should be mentioned that Step 202 and the step of determining whether the level amount of the pixel brightness levels having the pixel amount larger than the pixel average amount is larger than 3 and whether the continuous level amount corresponding to the pixel brightness levels is larger than half of the level amount of the pixel brightness levels are omissible. That is, in another embodiment omitting the aforesaid steps, the projector of the present invention can determine whether to control the power source to output the overload current to the projection device for image projection only according to the monitoring result of the working temperature and whether the level amount of the pixel brightness levels having the pixel amount larger than the pixel average amount is less than or equal to half of the total brightness level amount, so as to simplify the projection brightness adjustment method.

In summary, the present invention has no need to adopt the design of increasing the light emitting efficiency of the light source (e.g. utilizing a high-power light source, improving the light path system of the projector, or increasing the lens reflectivity and transparency of the projector). That is, the projection brightness adjustment method of the present invention just needs to utilize the temperature sensor to detect the working temperature of the projection device and control the projector enter the overload mode for increasing the contrast of the image according to the temperature detecting result and whether the level amount of the pixel brightness levels having the pixel amount larger than the pixel average amount is less than or equal to half of the total brightness level amount. In such a manner, the present invention can solve the prior art problem that the design of modifying the hardware design of the projector causes a high manufacturing cost and additional disposal of the heat dissipating system in the projector increases the overall volume of the projector, so as to efficiently reduce the manufacturing cost of the projector and be advantageous to the thinning design of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection brightness adjustment method applied to a projector, the projection brightness adjustment method comprising:
   driving the projector to project an image by a power source;
   detecting a working temperature of the projector by a temperature sensor;
   dividing a total pixel amount of the image by a total brightness level amount of the image to calculate a pixel average amount corresponding to each pixel brightness level of the image;
   determining whether the working temperature is less than an upper operating-temperature limit of the power source;
   determining a level amount of the pixel brightness levels having a pixel amount larger than the pixel average amount;
   determining whether the level amount is less than or equal to half of the total brightness level amount; and
   controlling the power source to output an overload current to the projector for image projection when determining the working temperature is less than the upper operating-temperature limit and determining the level amount is less than or equal to half of the total brightness level amount, wherein the magnitude of the overload current is between a maximum current limit and the upper operating-current limit of the power source.

2. The projection brightness adjustment method of claim 1, wherein the projector controls the power source to output the overload current to the projector when determining the working temperature is less than the upper operating-temperature limit, determining the level amount of the pixel brightness levels is less than or equal to half of the total brightness level amount and larger than 3, and determining a continuous level amount corresponding to the pixel brightness levels is larger than or equal to half of the level amount.

3. The projection brightness adjustment method of claim 1, wherein the projector controls the power source to output the overload current to the projector when determining the working temperature is less than the upper operating-temperature limit and determining the level amount of the pixel brightness levels is less than or equal to 3.

4. The projection brightness adjustment method of claim 1 further comprising:
the projector setting a brightness value of the image according to one of the pixel brightness levels when determining a ratio of a sum of pixels from the one of the pixel brightness levels to the highest pixel brightness level to the total pixel amount of the image is equal to 20%; and
the projector reducing an output current of the power source according to the brightness value.

5. A projector comprising:
a projection device;
a power source electrically connected to the projection device for driving the projection device to project an image;
a temperature sensor electrically connected to the projection device for detecting a working temperature of the projection device; and
a processor electrically connected to the projection device, the temperature sensor and the power source, the processor calculating a pixel average amount corresponding to each pixel brightness level of the image according to a total pixel amount of the image and a total pixel brightness level amount of the image, the processor determining whether the working temperature is less than an upper operating-temperature limit of the power source, the processor determining a level amount of the pixel brightness levels having a pixel amount larger than the pixel average amount, the processor determining whether the level amount is less than or equal to half of the total brightness level amount, and the processor controlling the power source to output an overload current to the projection device for image projection when determining the working temperature is less than the upper operating-temperature limit and determining the level amount is less than or equal to half of the total brightness level amount, wherein the magnitude of the overload current is between a maximum current limit and the upper operating-current limit of the power source.

6. The projector of claim 5, wherein the processor controls the power source to output the overload current to the projection device when determining the working temperature is less than the upper operating-temperature limit, determining the level amount of the pixel brightness levels is less than or equal to half of the total brightness level amount and larger than 3, and determining a continuous level amount corresponding to the pixel brightness levels is larger than or equal to half of the level amount.

7. The projector of claim 5, wherein the processor controls the power source to output the overload current to the projection device when determining the working temperature is less than the upper operating-temperature limit and determining the level amount of the pixel brightness levels is less than or equal to 3.

8. The projector of claim 5, wherein the projection device sets a brightness value of the image according to one of the pixel brightness levels when determining a ratio of a sum of pixels from the one of the pixel brightness levels to the highest pixel brightness level to the total pixel amount of the image is equal to 20%, and the projection device reduces an output current of the power source according to the brightness value.

* * * * *